March 17, 1970   D. WHITTLE ET AL   3,501,274
FUEL OIL INJECTOR FOR CARBON BLACK REACTOR
Filed Oct. 30, 1967   3 Sheets-Sheet 1

INVENTORS
Donald Whittle
David C. Williams
BY Walter H. Schneider
ATTORNEY

March 17, 1970  D. WHITTLE ET AL  3,501,274
FUEL OIL INJECTOR FOR CARBON BLACK REACTOR
Filed Oct. 30, 1967  3 Sheets-Sheet 2
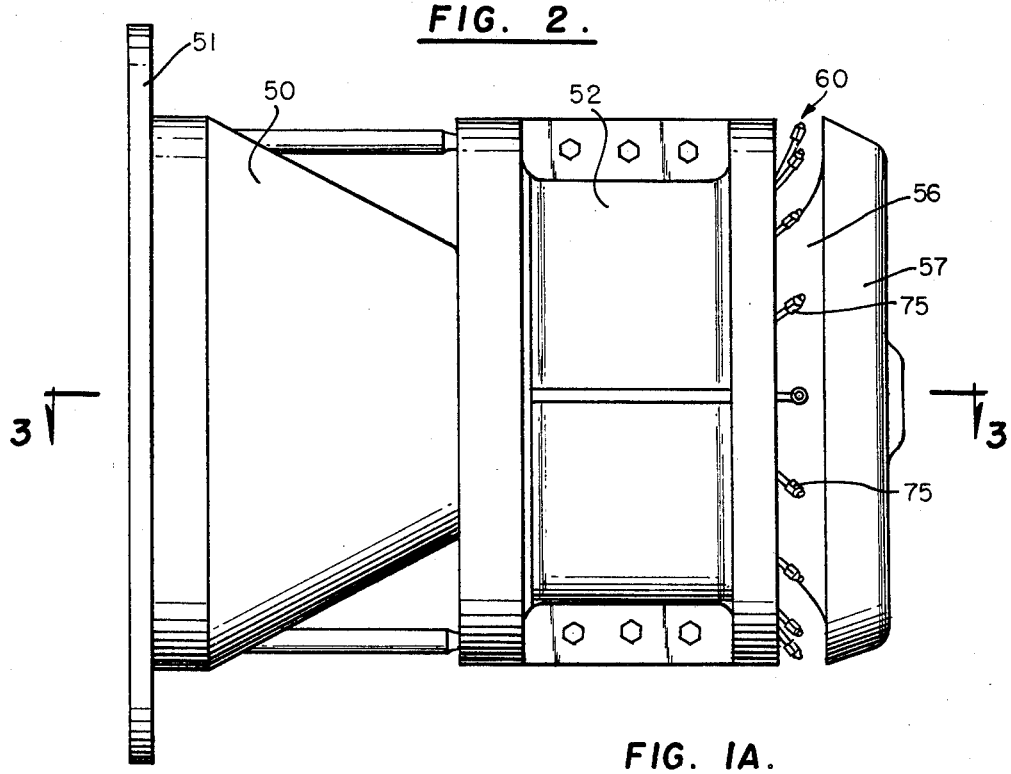
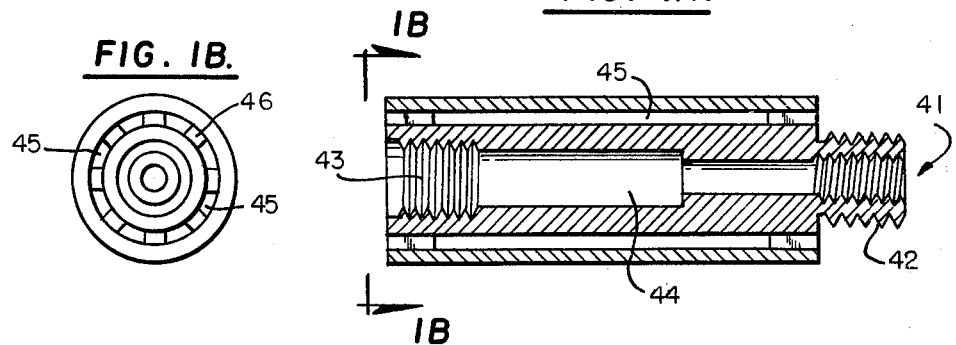
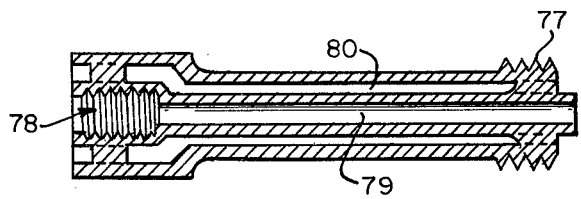
INVENTORS
Donald Whittle
David C. Williams
BY Walter H. Schneider
ATTORNEY

United States Patent Office 3,501,274
Patented Mar. 17, 1970

3,501,274
FUEL OIL INJECTOR FOR CARBON
BLACK REACTOR
Donald Whittle and David C. Williams, Houston, Tex., assignors to Ashland Oil & Refining Company, Houston, Tex., a corporation of Kentucky
Filed Oct. 30, 1967, Ser. No. 678,962
Int. Cl. C09c 1/48; C01c 31/02; C10b 47/04
U.S. Cl. 23—259.5                                10 Claims

ABSTRACT OF THE DISCLOSURE

A furnace-type carbon black reactor having a heating zone is provided with a feedstock inlet for discharging a feedstock into said zone, and with a burner having a combustion-supporting gas inlet and fuel introduction means for burning said fuel to heat the feedstock in said zone without intimate contact between said feedstock and the burning fuel. The fuel introduction means includes a fuel distributing ring disposed closely adjacent to the central axis of the burner and heating zone at a position shielded from heat in the zone, and a plurality of elongated nozzles extend from the distributing ring past the gas inlet to a combustion orifice for mixture with the introduced combustion-supporting gas.

BACKGROUND OF THE INVENTION

The present invention relates to furnace-type carbon black reactors of the general types disclosed in Williams U.S. Patent No. 3,060,003 issued Oct. 23, 1962, for "Process and Apparatus for Producing Carbon Black," and in Wright et al. U.S. Patent No. 3,290,120, issued Dec. 6, 1966, for "Apparatus for the Production of Carbon Black;" and is, more particularly, concerned with an improvement on the structures thus previously disclosed.

In the aforementioned Williams Patent 3,060,003 a carbon black reactor is disclosed constituting a generally tubular combustion chamber provided with feedstock and fuel inlet means, and with a combustion supporting gas inlet, all situated at one end of the chamber. The fuel and combustion supporting gas are supplied to a ring-shaped orifice disposed in surrounding relation to the feedstock inlet; and the mixture and fuel and gas is burned at said orifice in such manner that the burning mixture and its products of combustion flow generally outward from the axis of the combustion zone, along which axis the feedstock is supplied, to produce heating of the feedstock and mixing of the feedstock with the combustion products in said combustion zone, while minimizing contact between the feedstock and burning fuel. Various structural and operational considerations relating to reactors of this general type, and the types and quantities of fuel, combustion supporting gas, and feedstock which may be employed in such reactors, are discussed in Patent No. 3,060,003 as well as in the aforementioned Patent No. 3,290,120; and the disclosures of these prior patents are incorporated herein by reference for a general description of these considerations.

The burner arrangement employed in Williams Patent No. 3,060,003 includes an apertured ring and combustion supporting gas inlet adapted to inject a mixture of fuel and combustion supporting gas into a ring-shaped orifice defined between a portion of the burner and an adjacent deflector structure. The aforementioned apertured ring, provided to inject fuel into said orifice, is disposed relatively closely adjacent to the orifice itself at a position relatively remote from the central axis of the burner along which the feedstock is injected, with the combustion supporting gas inlet being positioned between said apertured ring and the central burner axis.

A relatively similar disposition of elements is disclosed in Wright et al. U.S. Patent No. 3,290,120, identified previously; but certain of the elements in this latter arrangement are modified to adapt the burner to the combustion of more viscous fuel stocks than were contemplated in Patent No. 3,060,003. The burner arrangement utilized in Wright U.S. Patent No. 3,290,120 employs, in place of the aforementioned apertured ring, a fuel distributing ring annularly disposed about the feedstock inlet at a position relatively remote from the feedstock inlet and relatively closely adjacent to the aforementioned combustion orifice. The distributing ring operates to inject fuel, preferably atomized, into the orifice for mixture with a combustion supporting gas directed toward said orifice from a combustion supporting gas inlet disposed between the fuel distributing ring and the main axis of the burner.

This latter arrangement, while entirely adequate for successful operation of the burner, has been found in some circumstances, particularly when it is attempted to burn extremely viscous fuels for extended periods of time, to exhibit certain operational difficulties requiring increased maintenance. More particularly, it has been found that positioning of the fuel distributing ring at a location relatively remote from the main axis of the burner exposes the distributing ring to the relatively high temperatures generated in the reactor combustion zone. These high temperatures, imposed on the distributing ring for extended periods of time, have been found to result in the formation of coke deposits in the ring with consequent impairment of the fuel feeding functions of said ring.

The present invention recognizing these difficulties achieved in practice under the circumstances described, is concerned with modified burner arrangements wherein the fuel distributing ring is so located as to be more effectively shielded from heat generated in the combustion zone, thereby eliminating the undesirable coke deposits mentioned, or inhibiting their formation for longer periods of time than were possible heretofore.

Summary of the invention

In accordance with the improved arrangement contemplated by the present invention, a carbon black reactor of the general type disclosed in the aforementioned U.S. Patents No. 3,060,003 and No. 3,290,120 is provided with a combustion chamber having provision for injecting a hydrocarbon feedstock generally along the axis of said chamber; and burner means are provided for supplying a hydrocarbon fuel and a combustion supporting gas to an annular or ring-shaped orifice defined between one end of the burner and an adjacent deflector structure. The fuel injection means comprises a fuel distributing ring. However, in distinction to the arrangement contemplated in Patent No. 3,290,120, the fuel distributing ring of the present invention is positioned closely adjacent to the central axis of the combustion zone in closely surrounding relation to the feedstock injection means, at a position relatively remote from the combustion orifice; and relatively elongated nozzles (adapted, if desired, for atomizing fuel) extend outward from said distributing ring toward the combustion orifice. The combustion supporting gas inlet is, in turn, positioned in surrounding relation to the distributing ring, between said ring and the aforementioned orifice, whereby combustion supporting gas introduced into said inlet surrounds and flows past the aforementioned elongated nozzles before being mixed with fuel at said orifice.

The positioning of the distributing ring closely adjacent to the central axis of the burner and combustion zone causes said ring to be located within the "shadow" of the aforementioned deflector, whereby the ring is exposed to significantly lower temperatures than is the case in the arrangement of Patent No. 3,290,120. Moreover, the arrangement actually achieves a redistribution of the metallic masses used to guide and inject fuel, and reduces the mass of the metal parts which are subject to the high temperature radiant heat from the combustion chamber, by positioning the relatively massive distributing ring near the burner axis and by extending relatively small and light weight nozzles from the ring toward the combustion orifice. The combustion supporting gas inlet is disposed in surrounding relation to the ring, between said ring and orifice and a large volume of combustion supporting gas is accordingly caused to flow over the periphery of the ring and around the extended relatively light weight nozzles as said gas passes toward the orifice. This further tends to limit the temperatures to which the distributing ring and nozzles are subjected. More particularly, a smaller mass of metal (the extended nozzles) is subjected to the cooling effects of a large volume of entering gas, and even though the entering gas may be preheated to 700 or 800 degrees, the gas still achieves a cooling effect on the nozzles. The overall arrangement thus reduces the temperature rise of the distributing ring and nozzles during continued burner operation, and correspondingly reduces the possibility of coke formation.

Brief description of the drawings

FIGURE 1A is a detail cross sectional view of a nozzle extension which may be employed in the arrangement of FIGURE 1;

FIGURE 1B is a view taken on line 1B—1B of FIGURE 1A;

FIGURE 2 is a side view of a burner arrangement constructed in accordance with a second embodiment of the present invention;

FIGURE 4 is a cross-sectional detail view of a nozzle extension which may be employed in the arrangement of FIGURE 3.

Description of the preferred embodiments

Figure 1:
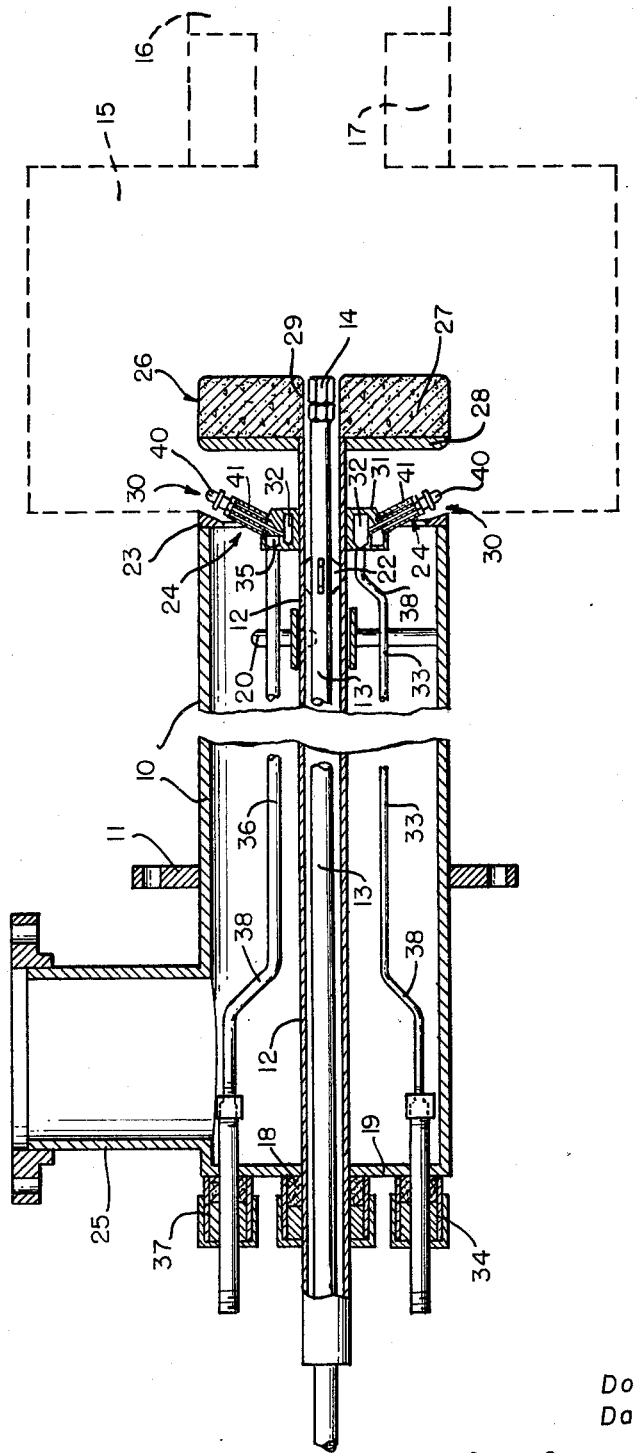
FIGURE 1 is a longitudinal sectional view of a burner arrangement constructed in accordance with one embodiment of the present invention.

The burner arrangement of FIGURE 1 is, in certain respects, similar to that described in U.S. Patent No. 3,290,120 described previously. To that effect, the burner comprises a relatively large diameter tubular member 10 having a flange structure 11 for mounting the burner on the reactor shell (not shown). A smaller diameter tubular member 12 is disposed within tubular member 10 in coaxial relation thereto; and smaller diameter tubular member 12 further supports an elongated feedstock conduit 13 in coaxial relation thereto. A nozzle 14, preferably having a conical spray pattern, is mounted at one end of feedstock supply conduit 13 at a position forward of burner member 10, and located within a cylindrical heating zone 15, on the central axis of said zone 15. The reactor further includes a reaction zone 16 having a choke ring 17 at its inlet end, the elements 16 and 17 also being coaxial with one another and with heating zone 15. The parts 15, 16 and 17 have been shown in broken line in FIGURE 1 since these parts are in themselves well known; and reference is made to Williams U.S. Patent No. 3,060,003 identified previously for a more complete description of a possible construction which these elements may take.

Tubular member 12 passes through, and is partially supported by a burner end plate 19 closing one end of tubular member 10, and an appropriate sealing structure 18 is provided between end plate 19 and member 12. The other end of tubular member 12 is supported within tubular member 10 by a plurality of spoke-like radial supports 20 extending between a ring 21 surrounding tubular member 12 and the interior of tubular member 10. Feedstock supply conduit 13 is supported within tubular member 12 by any appropriate means, e.g., a plurality of fin-like supports 22.

The end of tubular member 10, opposite to end plate 19, is provided with a beveled ring 23 forming an annular opening 24 disposed in surrounding relation to tubular member 12, coaxial with the central axis of the burner and with the central axis of heating zone 15 and of reaction zone 16. An air inlet T 25 provided with a mounting flange is attached to tubular member 10 and provides an inlet for an appropriate combustion supporting gas, the gas passing from T 25 through the region between tubular members 10 and 12 to opening 24.

The forward end of tubular member 21 protrudes into heating zone 15 beyond ring 23 and opening 24. An annular deflector 26, comprising a refractory body 27 having a metallic disc 28 on the face thereof facing the burner, is mounted within zone 15, perpendicular to the axis of said zone, on the protruding end of tubular member 12 as illustrated. Deflector 26 is provided with a central bore 29 for receiving nozzle 14; and the feedstock may thus be sprayed into heating zone 15. Deflector 26 is situated completely within heating zone 15, whereas beveled ring 23 is positioned substantially coplanar with the inlet end of heating zone 15 in a plane substantially perpendicular to the axis of heating zone 15. Ring 23 and deflector 26 thus cooperate with one another to define an annular or ring shaped orifice 30 disposed closely adjacent the upstream end of heating zone 15.

The combustion supporting gas passing from T 25 through aperture 24 flows between deflector 26 and ring 23 in a generally radial direction toward orifice 30. Orifice 30 is also supplied with a hydrocarbon fuel by means of a nozzle header comprising a fuel distributing ring 31 mounted on tubular member 12 at a position relatively closely adjacent the central axis of the burner. Disributing ring 31 has an interior chamber 32 which is supplied with a hydrocarbon fuel by means of an elongated inlet pipe 33 attached at one of its ends to ring 31, and extending at its other end through end plate 19 via an appropriate sealing structure generally designated 34. Distributing ring 31 also has an interior chamber 35, which is supplied with atomizing gas, e.g. air, natural gas, etc., by means of an inlet pipe 36 extending through end plate 19 via an appropriate sealing structure 37. Air is most commonly used as the atomizing medium, and thus, for the sake of simplicity, pipe 36 will be referred to as an "air" inlet, it being understood that any other suitable atomizing gas can be substituted.

Fuel inlet pipe 33 and air inlet pipe 36 are coplanar with the burner axis and, together with distributing ring 31, form a nozzle header which is generally similar in construction to that described in U.S. Patent No. 3,290,120. It will be noted, however, that the fuel and air inlet pipes 33 and 36 are provided with appropriate bends, designated 38, whereby ring 31 is positioned closely adjacent the central axis of the burner, with combustion supporting gas inlet 24 disposed in surrounding relation to ring 31 between said ring 31 and orifice 30. This relationship between ring 31 and gas inlet 24 is reverse to that described in the aforementioned Patent No. 3,290,120.

A plurality of atomizing nozzles 40, having discharge orifices positioned closely adjacent to combustion orifice 30, are connected to distributing ring 31 by means of elongated nozzle adapters 41. The nozzle adapters 41, as shown in detail in FIGURES 1A and 1B, may comprise elongated concentric tubular members spaced from one another by webs 46. The inner tubular member has a thread fitting 42 at one end thereof for screw attachment to ring 31, and is interiorly threaded at 43 adjacent the other end thereof for reception of atomizing nozzles 40. The adapters include a central passageway 44 for passage of a hydrocarbon fuel to atomizing nozzles 40, and also include outer passages 45 defined between supporting webs 46 for passing atomizing air from chamber 35 of distributing ring 31 to nozzles 40.

It will be appreciated, of course that the nozzles 40 and adapters 41 can, if desired, be made integral with one another rather than as separable elements. Therefore, the term "elongated nozzle" used herein, and in the appended claims, is intended to cover either type of structure.

In the present embodiment of the invention the elongated relatively light weight nozzles 40, 41 extend angularly, but generally radially, toward orifice 30 from a position closely adjacent the burner axis. In so extending, the elongated nozzles are disposed within the path of flow of a relatively large volume of combustion supporting gas passing from opening 24 toward orifice 30. The fuel supplied to orifice 30 is atomized (in the specific arrangement of FIGURE 1), and this atomized fuel is mixed with combustion supporting gas at orifice 30 for combustion in the manner, and for the purposes, described in the earlier patents identified previously. The relatively massive distributing ring 31 is, however, due to its new positioning, located at a point removed from the actual combustion; and said ring 31 is, moreover, relatively well shielded by deflector 26 from the elevated temperatures present in heating zone 15. The new location of massive distributing ring 31, associated with the elongated light weight nozzles 40, 41, accordingly assures that the ring and nozzles are operated at far lower temperatures than is the case in the arrangement of U.S. Patent No. 3,290,120 with the attendant advantages already described.

Figure 3:
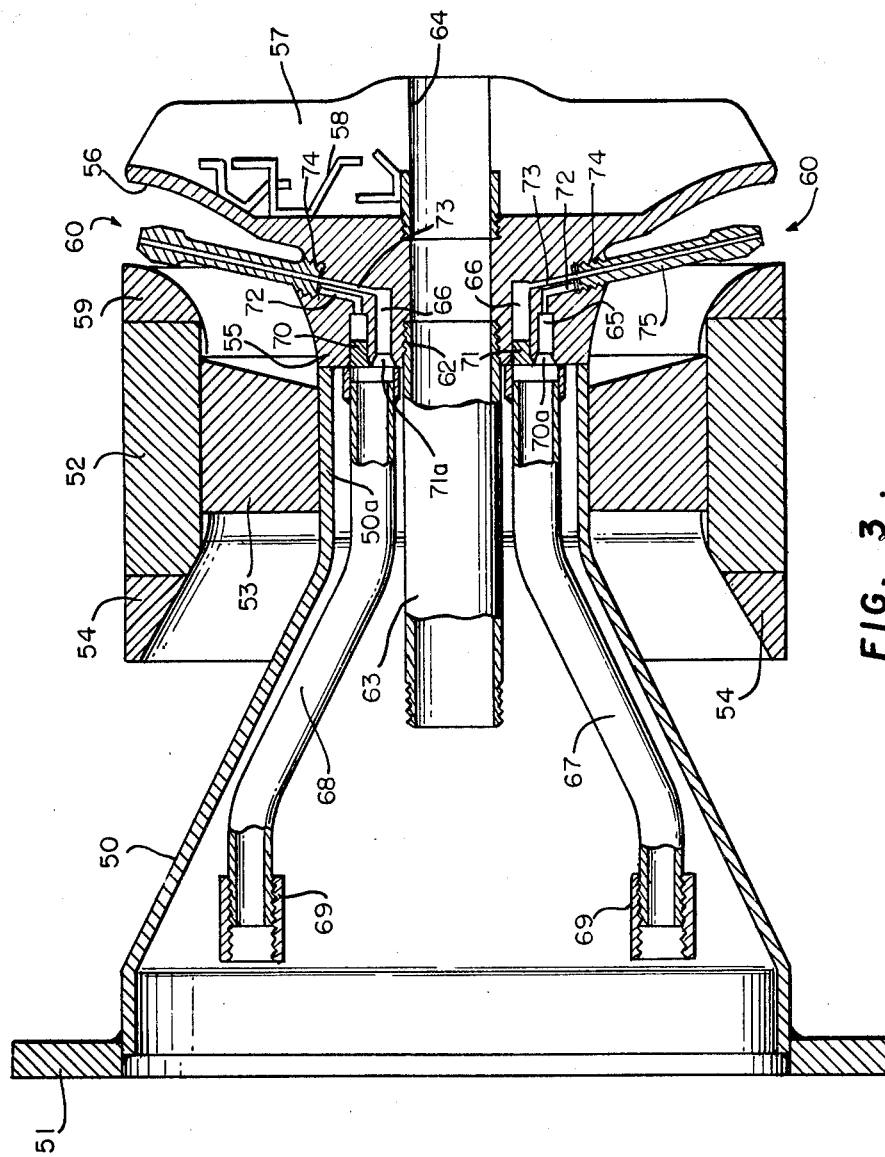
FIGURE 3 is a cross-sectional view of the burner arrangement shown in FIGURE 2, taken on line 3—3 of FIGURE 2.

An alternative burner arrangement exhibiting similar operation and additional advantages to those described in reference to FIGURE 1, is illustrated in FIGURES 2 through 4. The alternative arrangement unifies a number of the burner parts. More particularly, the burner of FIGURES 2 through 4 is provided with a general conical shell 50 having a flange 51 at one end thereof for mounting the burner on the reactor. The single flange 51 FIGURE 3 can be more securely sealed than the double flange arrangement of FIGURE 1, and accordingly tends to minimize air leakage which is a serious problem in reactors of the types here involved. A sleeve 52 is supported on a cylindrical extension 50a of shell 50 by means of a plurality of vanes 53. The upstream end of sleeve 52 is contoured at 54 to conform to the inclination of conical shell 50 thereby to provide a circular space acting as a combustion supporting gas inlet. As a result of this gas inlet configuration, "T's" of the type shown at 25 in FIGURE 1 are avoided, and lower combustion supporting gas pressure drops are achieved.

The downstream end of shell extension 50a is attached, e.g., by welding, to the upstream end of a forged header member 55. The outermost surface of header member 55 is smoothly curved, as illustrated, and a flared flange 56 having a curvature smoothly continuing that of header member 55 is attached, e.g., by welding, to the downstream end of header member 55. Flared flange 56 acts as the interior surface of a deflector structure generally similar in operation to that of deflector 26 described earlier. To this effect, a cast refractory material body 57 is attached to flange 56 with the aid of a plurality of refractory clips generally designated 58 which are welded to the flange 56.

The downstream end of sleeve 52 is provided with a ring 59 having an interior curvature generally conforming to the curvatures of flange 56 and of forged header member 55. Members 55, 56 and 59 thus cooperate with one another to provide a smooth streamlined continuation of the passageway for combustion supporting gas, terminating in an annular or ring-shaped orifice 60.

Forged header member 55 is provided with a central bore 61 extending along the axis of the burner, and is threaded at 62 for reception of an elongated pipe 63 through which the feedstock supply conduit (not shown) may pass. Case refractory member 57 is also supplied with a central bore 64 mating with and comprising a continuation of bore 61 for reception of the feedstock supply nozzle. Header member 55 has a pair of interior chambers 65 and 66 for reception of atomizing air (when it is used) and a hydrocarbon fuel respectively. An air inlet pipe 67 is attached to the header member 55, and a fuel pipe 68 is also attached to said header member 55, with each of said pipes 67 and 68 being supplied with appropriate screw couplings 69 for attachment to the appropriate sources of air and fuel.

For ease of machining, the chambers 65 and 66 are preferably first formed as concentric grooves in forged member 55, the upstream ends of which are subsequently closed by rings 70 and 71. Rings 70 and 71 are provided with openings 70a and 71a mating with pipes 67 and 68 as illustrated. Chambers 65 and 66 are communicated respectively by means of separate interior channels 72 and 73 to angularly spaced locations adjacent threaded exterior recesses 74 in header member 55. A plurality of elongated nozzles 75 threadedly engage recesses 74, and extend from the header 55, i.e. from a position closely adjacent the axis of the burner in the shadow of the deflector 56, 57, through the flow passage of combustion supporting gas, substantially to orifice 60.

In the arrangement shown in FIGURE 3, the elongated nozzles 75 are provided with a single interior passageway mating, when the nozzles 75 are in threaded engagement with recesses 74, with the channels 73 leading to fuel chamber 66. The nozzles 75, in this particular form of the invention, are intended to be supplied with a gaseous fuel; and since such a fuel need not be atomized for combustion purposes, no nozzle passageways are provided for an atomizing gas. When nozzles 75 are employed, therefore, the nozzle bases can be arranged to cover channels 72.

The structure of FIGURE 3 is adapted to burn an atomized liquid fuel, as well as gaseous fuels; and when this alternative type of operation is desired, each of nozzles 75 can be replaced by an appropriate atomizing nozzle and elongated nozzle adapter. One such possible nozzle adapter, capable of use in the arrangement of FIGURE 3 for atomizing and burning a liquid fuel, is shown in FIGURE 4. The adapter, generally designated 76, is similar to that already described in reference to FIGURES 1A and 1B, and includes a threaded end 77 for engagement with a header recess 74. The opposing end of the adapter 76 is threaded at 78 for reception of an atomizing nozzle. Adapter 76 includes a central elongated bore 79 arranged to mate with a channel 73 for flow of liquid fuel from pipe 68 and header chamber 66 to the nozzle; and further includes an outer annular passageway 80 adapted to mate with a header channel 72 for flow of atomizing air from air inlet pipe 67 and header chamber 65 to the nozzle.

The arrangement of FIGURE 3 operates, in general, in the manner previously described in reference to FIGURE 1; but unifies the deflector and burner proper, and simultaneously provides an improved arrangement of flow passages for combustion supporting gas, fuel, and atomizing air (when desired). While the arrangement of FIGURE 3, as described, permits either liquid or gaseous fuels to be employed, it will be understood, of course, that similar provision may be made in the arrangement of FIGURE 1.

While we have thus described preferred embodiments of the present invention, many variations will be suggested to those skilled in the art. The foregoing description should therefore not be considered limitative; and all such variations and modifications as are in accord with the principles described are meant to fall within the scope of the appended claims.

Having thus described our invention, we claim:

1. In a furnace-type carbon black reactor of the type having a generally tubular chamber, and inlet means for feedstock, fuel, and combustion supporting gas at one end of said chamber, the improvement wherein said fuel inlet means comprises a fuel injection ring disposed concentric with and closely adjacent to the axis of said tubular chamber, said gas inlet means comprising means defining an opening for combustion supporting gas disposed at a position more remote than said injection ring from said chamber axis, heat shielding means disposed within said chamber at a position downstream of said fuel inlet means and said gas inlet means, said heat shielding means extending in a direction transverse to said chamber axis in axially spaced relation to both said fuel injection ring and said opening, said heat shielding means having an outermost edge relatively widely spaced in a radial direction from the axis of said chamber and from the outer diameter of said injection ring, and a plurality of elongated fuel nozzles extending generally transverse to said chamber axis from said injection ring across said combustion supporting gas opening to a position adjacent said outermost edge of said annular heat shielding means.

2. The improvement of claim 1 wherein said elongated nozzles comprise atomizing nozzles, and said injection ring includes means for supplying fuel and an atomizing medium to said nozzles.

3. The improvement of claim 1 wherein said elongated nozzles comprise gas nozzles, and said injection ring includes means for supplying a combustible gas to said nozzles.

4. The improvement of claim 1 wherein said heat shielding means comprises an annular metallic flange integral with said injection ring, and a body of refractory material removably attached to said metallic flange.

5. The improvement of claim 1 wherein said feedstock means comprises an elongated tubular member extending coaxial with said chamber from a position exterior of said chamber to a position interior of said chamber, said injection ring and said heat shielding means both being supported by said tubular member in axially spaced relation.

6. A burner for a furnace-type carbon black reactor comprising elongated feedstock conduit means, an annular deflector mounted adjacent one end of said feedstock conduit means in coaxial relation thereto, said deflector having an annular face extending transverse to the direction of elongation of said conduit means, tubular means surrounding said feedstock conduit means in coaxial spaced relation thereto for defining a combustion supporting gas passageway surrounding at least a portion of said feedstock conduit means, the outermost diameter of said tubular means being substantially equal to the outside diameter of said deflector, said tubular means extending toward said annular face of said deflector and terminating in spaced relation to said annular face to define a ring-shaped orifice therebetween, a relatively massive fuel injection ring surrounding said conduit means at a position closely adjacent said conduit means and having its outer diameter relatively remote from said ring-shaped orifice, a plurality of elongated relatively lightweight nozzles extending from said injection ring toward said orifice in a direction generally transverse to the direction of elongation of said conduit means, said elongated nozzles having discharge openings disposed closely adjacent to said orifice and relatively remote from said injection ring, said combustion supporting gas passageway including a portion surrounding said injection ring and positioned between said injection ring and said orifice for passing a combustion supporting gas around the exteriors of said elongated nozzles toward said orifice, and fuel supply means coupled to said ring for supplying a combustible fuel through said elongated nozzles to said discharge openings for mixture with combustion supporting gas at said orifice.

7. The burner of claim 6 wherein said elongated nozzles are atomizing nozzles, and supply means for feeding a combustible fuel and an atomizing medium to said injection ring and nozzles, said supply means comprising a pair of elongated pipe lines extending toward said ring in substantially coplanar relation to one another and to the axis of said elongated feedstock conduit means.

8. The burner of claim 6 wherein said injection ring, said deflector, and at least a portion of said tubular means are integral with one another.

9. The burner of claim 8 wherein said tubular means comprises a conical shell having a cylindrical extension at one end thereof attached to said injection ring, said tubular means further including a tubular sleeve surrounding said cylindrical extension in spaced relation thereto, one edge of said sleeve extending axially beyond said cylindrical extension and being inclined in a direction generally parallel to a portion of said conical shell.

10. The burner of claim 9 wherein said deflector comprises a curved flange attached to said injection ring, the other edge of said sleeve axially overlying said injection ring and being curved generally similar to the curvature of said flange in spaced relation to said flange.

References Cited
UNITED STATES PATENTS

| | | | |
|---|---|---|---|
| 2,897,062 | 7/1959 | Minarik | 23—259.5 X |
| 3,060,003 | 10/1962 | Williams | 23—259.5 X |
| 3,222,131 | 12/1965 | Powell et al. | 23—209.4 |
| 3,290,120 | 12/1966 | Wright et al. | 23—259.5 |

MORRIS O. WOLK, Primary Examiner

D. G. CONLIN, Assistant Examiner

U.S. Cl. X.R.

23—209.4